United States Patent
Meylan et al.

(10) Patent No.: US 9,351,320 B2
(45) Date of Patent: May 24, 2016

(54) COLLISION AVOIDANCE FOR TRAFFIC IN A WIRELESS NETWORK

(71) Applicant: QUALCOMM Incorporated, San Diego, CA (US)

(72) Inventors: Arnaud Meylan, San Diego, CA (US); Shravan K. Surineni, San Diego, CA (US); Lalit Yerramilli Raju, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 62 days.

(21) Appl. No.: 14/530,140

(22) Filed: Oct. 31, 2014

(65) Prior Publication Data
US 2015/0049752 A1   Feb. 19, 2015

Related U.S. Application Data

(63) Continuation of application No. 11/751,472, filed on May 21, 2007, now abandoned.

(60) Provisional application No. 60/802,635, filed on May 22, 2006.

(51) Int. Cl.
| | |
|---|---|
| H04W 74/08 | (2009.01) |
| H04L 29/06 | (2006.01) |
| H04W 56/00 | (2009.01) |
| H04W 84/18 | (2009.01) |

(52) U.S. Cl.
CPC .......... *H04W 74/0816* (2013.01); *H04L 65/00* (2013.01); *H04W 56/0045* (2013.01); *H04W 84/18* (2013.01)

(58) Field of Classification Search
CPC ................................................ H04W 74/0816
USPC .......................................................... 455/434
See application file for complete search history.

(56) References Cited

U.S. PATENT DOCUMENTS

| | | | |
|---|---|---|---|
| 4,633,462 A | 12/1986 | Stifle et al. | |
| 6,023,472 A | 2/2000 | Kupchik et al. | |

(Continued)

FOREIGN PATENT DOCUMENTS

| | | |
|---|---|---|
| CN | 1516497 A | 7/2004 |
| JP | 2003235074 A | 8/2003 |

(Continued)

OTHER PUBLICATIONS

Ergen M., "IEEE 802.11 Tutorial", Dept. of Electrical Engineering and Computer Science Univ. of California Berkeley, Jun. 2002.

(Continued)

*Primary Examiner* — Christopher M Brandt
(74) *Attorney, Agent, or Firm* — Loza & Loza LLP

(57) ABSTRACT

Techniques for avoiding collision of traffic in a wireless network are described. A station detects for synchronization of its traffic with traffic of other stations. The station may detect for synchronization based on, e.g., percentage of first transmission failures, counters indicative of statistics of transmitted frames, and/or other information. The station may confirm synchronization of its traffic, e.g., by monitoring for traffic from another station during a service period for the station. The station adjusts transmission of its traffic when synchronization is detected to avoid collision with the traffic of the other stations. The station may delay transmission of its traffic by a predetermined amount of time, by a pseudo-random amount, or until after the other stations finish their transmissions.

37 Claims, 5 Drawing Sheets

(56) References Cited

U.S. PATENT DOCUMENTS

| | | |
|---|---|---|
| 7,161,951 B1 | 1/2007 | Sherman |
| 7,522,564 B2 | 4/2009 | Kakumaru et al. |
| 2002/0075891 A1 | 6/2002 | Souissi |
| 2004/0240426 A1 | 12/2004 | Wu et al. |
| 2005/0114749 A1 | 5/2005 | Yonge et al. |
| 2007/0293218 A1 | 12/2007 | Meylan et al. |

FOREIGN PATENT DOCUMENTS

| | | |
|---|---|---|
| JP | 2004260337 A | 9/2004 |
| JP | 2006074619 A | 3/2006 |

OTHER PUBLICATIONS

International Search Report—PCT/US07/069442, International Search Authority—European Patent Office—Nov. 14, 2007.

Karn, "MACA—A New Channel Access Method for Packet Radio", Amateur Radio 9th Computer Networking Conference, pp. 134-140, London, UK, Sep. 1990.

Std 802.11e-2005 "IEEE Standard for Information Technology—Telecommunications and Information Exchange Between Systems—Local and Metropolitan Area Networks—Specific Requirements Part 11: Wireless LAN Medium Access Control (MAC) and Physical Layer (PHY) Specifications Amendment 8: Medium Access Control (MAC) Quality of Service Enhancements", IEEE, Nov. 11, 2005, URL,http://ieeexplore.ieee.org/stamp/stamp.jsp"tp=&arnumber=1541572&tag=1.

Taiwan Search Report—TW096118265—TIPO—Aug. 29, 2014.

Taiwanese Search Report—TW096118265—TIPO—Jul. 31, 2010.

Tanenbaum S. A., <computer network>, translated by Yu-Mei Shaw and Yu-Chun Pan; Don Hua publisher, Taipei, Taiwan (Oct. 2003, first edition), pp. 275-293, 296-299, and 326-331.

Written Opinion—PCT/US07/069442, International Search Authority, European Patent Office, Nov. 14, 2007.

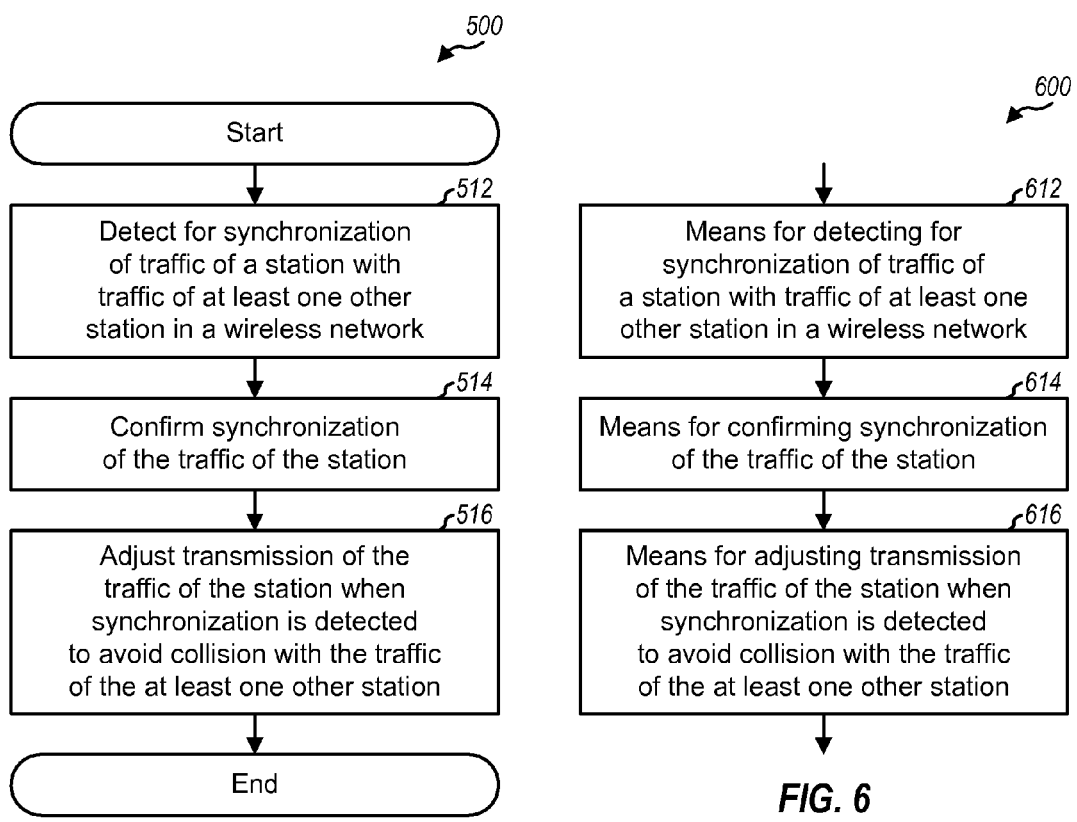

COLLISION AVOIDANCE FOR TRAFFIC IN A WIRELESS NETWORK

CLAIM OF PRIORITY

The present Application for Patent claims priority under 35 U.S.C. §119 to Provisional Application No. 60/802,635, titled "Collision avoidance for traffic in a wireless network" and filed May 22, 2006, and assigned to the assignee hereof; and priority under 35 U.S.C. §120 to Nonprovisional application Ser. No. 11/751,472, titled "Collision avoidance for traffic in a wireless network" and filed May 21, 2007, and assigned to the assignee hereof, the entire contents of which applications are hereby expressly incorporated by reference herein.

BACKGROUND

I. Field

The present disclosure relates generally to communication, and more specifically to techniques for transmitting data in a wireless communication network.

II. Background

Wireless networks are widely deployed to provide various communication services such as voice, video, packet data, and so on. These networks may be capable of supporting communication for multiple users by sharing the available network resources. Examples of such networks include wireless local area networks (WLANs), wireless wide area networks (WWANs), wireless metropolitan area networks (WMANs), and wireless personal area networks (WPANs). The terms "network" and "system" are often used interchangeably.

A wireless network may include any number of access points (APs) and any number of stations (STAs). An access point may act as a coordinator for communication with the stations. A station may actively communicate with an access point, may be idle, or may be powered down at any given moment depending on the data requirements of the station.

The access points and stations may operate in an unscheduled mode. In this mode, transmissions for different stations are not scheduled and hence may collide with one another when sent at the same time via a wireless channel. A collision typically results in transmission failures for all affected stations, which may then require retransmissions from these stations. The retransmissions consume air time (which is a valuable network resource), consumes battery power at the stations, cause additional delays in traffic data, and may result in other deleterious effects.

There is therefore a need in the art for techniques to avoid collision in unscheduled operation.

SUMMARY

Techniques to avoid collision of traffic in a wireless network are described herein. These techniques may be used for both scheduled and unscheduled traffic, e.g., to avoid collision between unscheduled traffic of a station and scheduled or unscheduled traffic of another station communicating with the same access point, or between scheduled or unscheduled traffic of a station communicating with an access point and scheduled or unscheduled traffic of another station communicating with another access point.

In an embodiment, a station detects for synchronization of its traffic with traffic of other stations in the wireless network. The traffic of the station may be, e.g., a periodic flow such as a voice-over-IP (VoIP) flow or a video telephony flow. The station may detect for synchronization in various manners and based on, e.g., percentage of first transmission failures, counters indicative of statistics of transmitted frames and/or received frames, and/or other information, as described below. The station may confirm synchronization of its traffic, e.g., by monitoring for traffic from another station during a service period for the station. The station adjusts transmission of its traffic when synchronization is detected in order to avoid collision with the traffic of the other stations. The station may delay transmission of its traffic by a predetermined amount of time, by a pseudo-random amount, until after the other stations finish their transmissions, and so on.

The collision avoidance techniques described herein may be used for various types of traffic and are especially applicable for periodic flows that carry traffic data on a regular basis, such as VoIP flows. The techniques reduce the likelihood of collision and retransmission and may provide various advantages such as higher network capacity, greater power savings for the stations, and reduced delays for the traffic.

Various aspects and embodiments of the invention are described in further detail below.

BRIEF DESCRIPTION OF THE DRAWINGS

The features and nature of the present invention will become more apparent from the detailed description set forth below when taken in conjunction with the drawings in which like reference characters identify correspondingly throughout.

FIG. 5 shows a process for avoiding collision for traffic.

FIG. 6 shows an apparatus for avoiding collision for traffic.

DETAILED DESCRIPTION

The word "exemplary" is used herein to mean "serving as an example, instance, or illustration." Any embodiment or design described herein as "exemplary" is not necessarily to be construed as preferred or advantageous over other embodiments or designs.

The collision avoidance techniques described herein may be used for various wireless networks such as WLANs, WWANs, WMANs, WPANs, and so on. A WLAN may implement one or more standards in the IEEE 802.11 family of standards developed by The Institute of Electrical and Electronics Engineers (IEEE) for WLANs.

Figure 1:
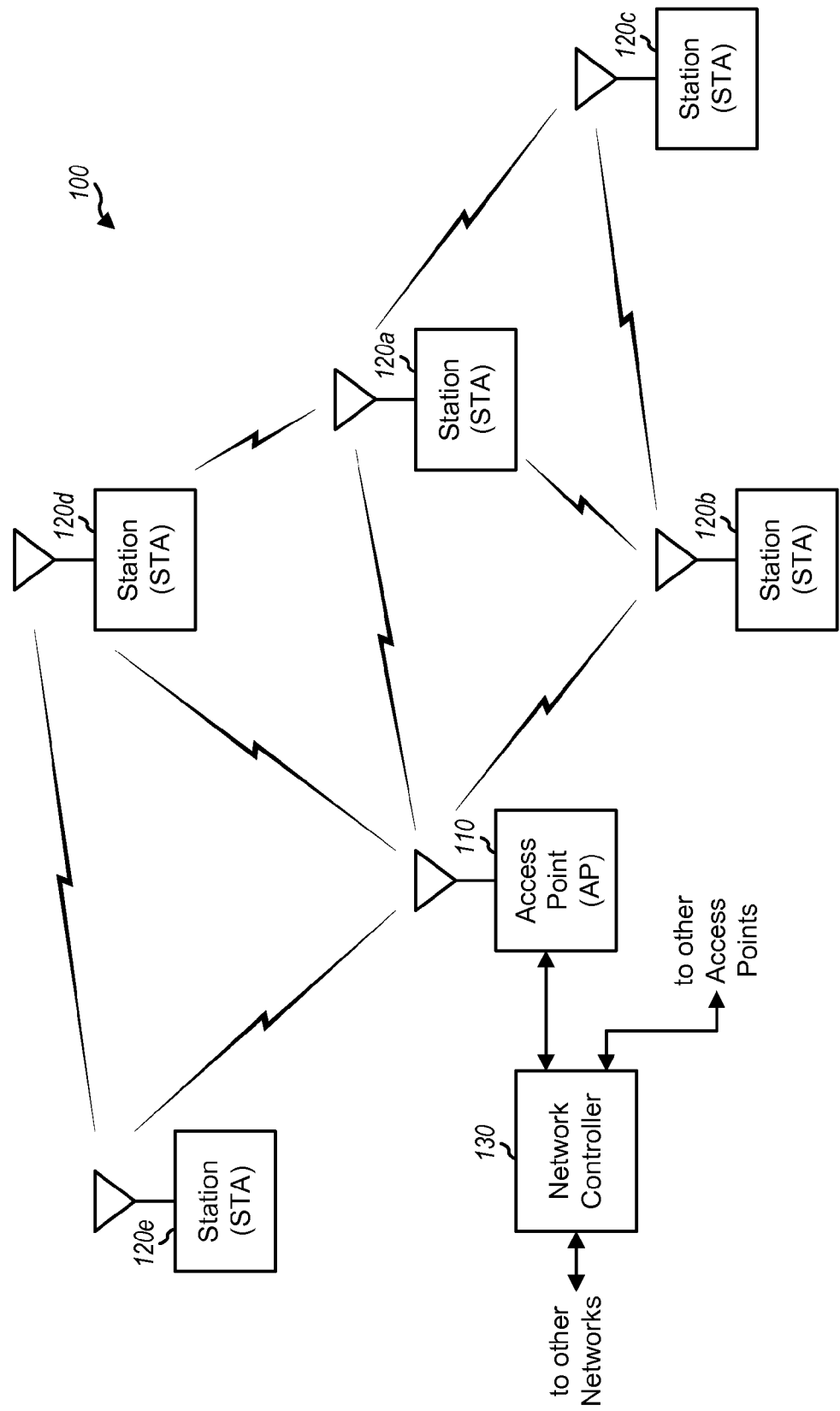
FIG. 1 shows a wireless network with an access point and multiple stations.

FIG. 1 shows a wireless network 100 with an access point (AP) 110 and multiple stations (STAs) 120. In general, a wireless network may include any number of access points and any number of stations. A station is a device that can communicate with another station via a wireless medium. The terms "wireless medium", "wireless channel" and "channel" are often used interchangeably. A station may communicate with an access point or peer-to-peer with another station. A station may also be called, and may contain some or all of the functionality of, a terminal, a mobile station, a user equipment, a subscriber station, and/or some other entity. A station may be a cellular phone, a handheld device, a wireless device, a personal digital assistant (PDA), a laptop computer, a wireless modem card, a cordless phone, and so on. An access point is a station that provides access to distribution services via the wireless channel for stations associated with that access point. An access point may also be called, and may contain some or all of the functionality of, a base station, a base transceiver subsystem (BTS), a Node B, and/or some other network entity.

For a centralized network, a network controller 130 couples to the access points and provides coordination and control for these access points. Network controller 130 may be a single network entity or a collection of network entities. For a distributed network, the access points may communicate with one another as needed without the use of network controller 130.

Wireless network 100 may be a WLAN that implements the IEEE 802.11 family of standards. For example, wireless network 100 may implement IEEE 802.11, 802.11a, 802.11b, 802.11e and/or 802.11g, which are existing IEEE 802.11 standards. Wireless network 100 may also implement IEEE 802.11n and/or 802.11s, which are IEEE 802.11 standards being formed. IEEE 802.11, 802.11a, 802.11b, 802.11g and 802.11n cover different radio or medium access technologies and have different capabilities. IEEE 802.11e covers quality of service (QoS) enhancements for a medium access control (MAC) layer. In IEEE 802.11e, a station that supports QoS facility is referred to as QSTA, and an access point that supports QoS facility is referred to as QAP. QoS facility refers to mechanisms used to provide parameterized and prioritized QoS.

A station (STA) may communicate with an access point (AP) or another station for one or more flows. A flow is a higher layer (e.g., TCP or UDP) traffic data stream that is sent via a communication link. A flow may also be referred to as a data stream, a traffic stream, a packet stream, and so on. A flow may carry any type of data such as, e.g., voice, video, email, web and/or any packet data. A flow may be for a particular traffic class and may have certain requirements on data rate, latency or delay, and so on. A flow may be periodic in cases where it is sampled, packetized and sent at regular intervals or non-periodic and sent sporadically, e.g., whenever there is data to send. A periodic flow is a flow in which data is sent periodically. For example, a flow for VoIP may send a data frame every 10 or 20 milliseconds (ms). As used herein, a frame may be a data frame, a null frame, a control frame, or some other type of frame send over the wireless medium. A frame may also be referred to as a packet, a data block, a data unit, a protocol data unit (PDU), a service data unit (SDU), a MAC PDU (MPDU), and so on. A station may have one or more flows for one or more traffic types for each of the downlink and uplink in a given call. For example, a VoIP call may have one VoIP flow for the uplink and another VoIP flow for the downlink.

Figure 2:
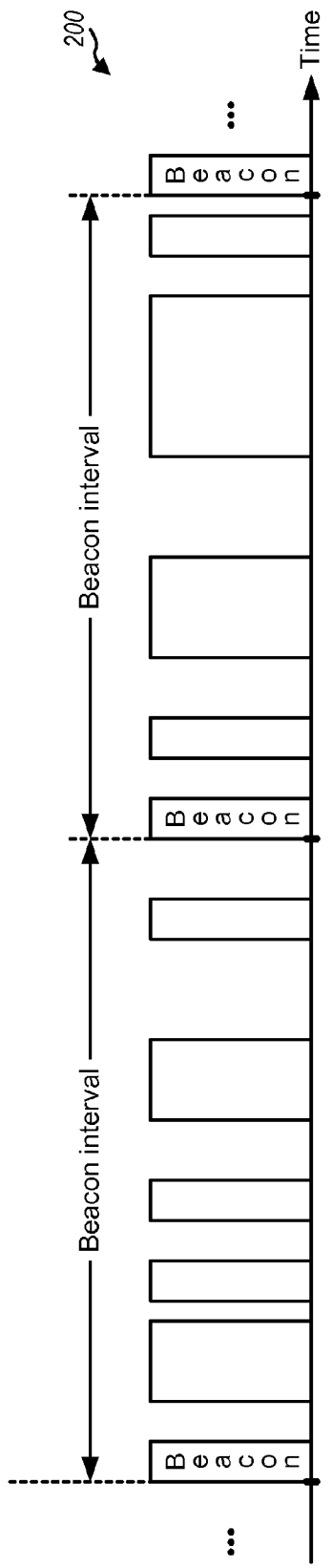
FIG. 2 shows a transmission timeline for the access point.

FIG. 2 shows an exemplary transmission timeline 200 for access point 110 in wireless network 100. In general, each access point in a wireless network maintains a separate timeline for all transmissions covered by that access point. The transmission timeline for access point 110 is described below. Access point 110 periodically transmits a beacon on the downlink. This beacon carries a preamble, an access point identifier (AP ID) that allows the stations to detect and identify the access point, and a list of parameters for operation in a network formed by the access point. The time interval between the start of two consecutive beacons is called a beacon interval. The beacon interval may be fixed or variable and may be set to a suitable duration, e.g., 100 ms. A target beacon transmit time (TBTT) is the next time instant when a beacon will be sent.

The time interval between the beacons may include any combination of controlled access periods (CAPs), scheduled access periods (SCAPs), and contention periods (CPs). Each CAP covers a period of time used by access point 110 for polled data transfers or network management. Each SCAP covers a period of time in which transmissions on the downlink and uplink are scheduled by access point 110. Each CP covers a period of time in which transmissions are not scheduled and a random channel access scheme is used by the stations to share the medium. The beacons, CAPs, and SCAPs represent contention free periods in which only one station (which may be access point 110 or one of stations 120) transmits on the channel at any given moment. The CPs represent contention periods in which enhanced distributed channel access (EDCA) may be used to gain access to the channel prior to transmission. More than one station may inadvertently transmit simultaneously on the channel during the CPs.

In general, any number of CAPs, SCAPs and CPs may be present in a given beacon interval. The SCAPs or CAP may not be present if wireless network 100 does not support scheduled or polled operation. The CAPs, SCAPs and CPs may be sent in any order. Furthermore, each of the CAPs, SCAPs and CPs may have any duration.

Each beacon interval may include any number of service periods for any number of stations. A service period is a contiguous time duration during which an access point may transmit one or more downlink frames to a station and/or may grant one or more transmission opportunities (TXOPs) to the same station. A TXOP is an allocation of time for transmission on a link. A service period may be scheduled or unscheduled. A given station may have any number of service periods within a given beacon interval. Outside of its service period, the station may not be able to receive frames because the receiver may be turned off, or the station may operate on a different system.

A traffic interval is the time interval between the start of two successive service periods for a station. The traffic interval for a periodic flow may be set based on the periodicity of the traffic being sent in that flow, e.g., 10 or 20 ms for VoIP. Different stations may have different traffic intervals. A service time is the start of a service period. The service times for a station are a series of time instances that are separated by the traffic interval for that station.

IEEE 802.11e defines two Automatic Power Save Delivery (APSD) modes that are referred to as scheduled APSD (S-APSD) and unscheduled APSD (U-APSD). Both APSD modes are used to provide power savings for stations. However, the two APSD modes operate in different manners.

Scheduled APSD utilizes centralized scheduling of service times by an access point. In scheduled APSD, transmissions for different stations may be scheduled so that they do not collide with one another. A station wakes up prior to its scheduled service period to transmit and/or receive data and may power down as much circuitry as possible at the end of the service period to conserve battery power. Scheduled APSD operation generally requires more resources at the access point (e.g., to manage and schedule the stations) and more signaling on both the downlink and uplink (e.g., to set up the schedule). Hence, wireless network 100 may or may not support scheduled APSD.

Unscheduled APSD requires no centralized coordination. In unscheduled APSD, each station may independently choose its service times. A station operating in unscheduled APSD, which is called a U-APSD station, receives the beacon from the access point to obtain pertinent system information. After the U-APSD station indicates that it enters the U-APSD mode of operation to the access point, the U-APSD station may initiate transmission whenever it has data to send on the uplink. On the downlink, the access point buffers data for the U-APSD station until the access point receives an indication that the U-APSD station is ready to receive the data. Transmissions on both the uplink and downlink are thus controlled and initiated by the U-APSD station. The U-APSD station may select any schedule for sending data on the uplink and for querying the access point for data on the downlink. The U-APSD station does not need to inform the access point of the schedule. Unscheduled APSD is efficient for bi-direction communication with periodic flows on both the downlink and uplink (e.g., VoIP). In this case, the U-APSD station may send data on the uplink and concurrently query for downlink data.

IEEE 802.11 defines a power-save (PS) mode for stations desiring to conserve battery power. A station that desires to go into the power-save mode indicates this intention to the access point by setting a PS-mode bit to '1' in a MAC header of a transmission sent to the access point. The power-save mode in IEEE 802.11 is similar in some regards to the unscheduled APSD mode in IEEE 802.11e. However, the power-save mode is not designed for QoS flows and also does not support different access categories for QoS differentiation. In the power-save mode, a station waits for a beacon indicating that buffered traffic data is available at the access point before issuing PS polls to retrieve the traffic data. The PS polls may be used in a similar fashion as unscheduled APSD if supported by the access point. The collision avoidance techniques described herein may be used for the power-save mode in IEEE 802.11, unscheduled APSD in IEEE 802.11e, and other modes.

Figure 3:
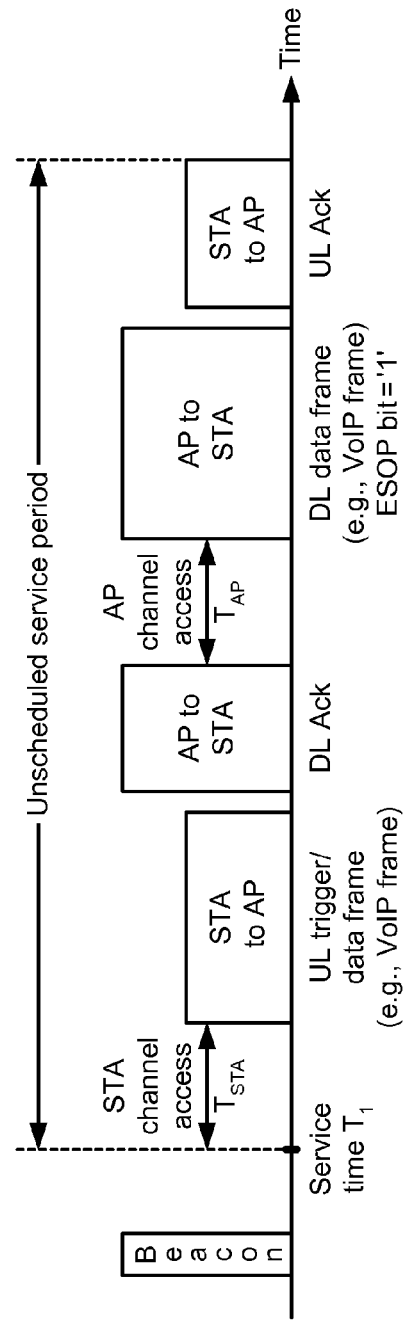
FIG. 3 shows unscheduled APSD operation for one station.

FIG. 3 shows unscheduled APSD operation for one station, e.g., station 120*a* in FIG. 1. The station has data to send on the uplink or desires to query for downlink data from access point 110. The station selects a service time of $T_1$. At service time $T_1$, the station performs an EDCA procedure defined by IEEE 802.11e to access the channel. The channel access may take a variable amount of time $T_{STA}$, which is dependent on whether the channel is busy and on the EDCA Access Category (AC) for the station. Upon gaining access to the channel, the station transmits a trigger frame to start a service period on the uplink (UL). This trigger frame may be a data frame (e.g., a VoIP frame), a QoS Null frame, or some other frame with an indication that it is a trigger frame. The formats for various types of frames are described in IEEE 802.11 documents.

The access point receives the trigger/data frame from the station and sends an acknowledgement (Ack) on the downlink (DL) to the station. This acknowledgement starts the service period. In general, the access point may send an acknowledgment for a single data frame or a block acknowledgment for multiple data frames. Hence, an "Ack" may be a single acknowledgment or any type of block acknowledgment. The access point may send data to the station along with the Ack, which is not shown in FIG. 3. The station uses the response (Ack or Data) from the access point to confirm the start of the service period. The station stays awake in the service period until it is terminated by the access point or a beacon is received with a bit map for that station set to zeros to indicate that there is no buffered data for that station at the access point. The access point may not have downlink data ready to send to the station and may simply send the Ack to confirm reception of the trigger frame and the start of the service period. The access point may then retrieve the data, perform channel access, and transmit data to the station in a subsequent downlink data frame, as shown in FIG. 3. The station may send an Ack for the downlink data frame. The access point may transmit a frame with an end-of-service-period (EOSP) bit set to '1' to indicate the end of the service period for the station, as shown in FIG. 3. The station remains awake until the end of the service period and acknowledges any data frame sent by the access point.

As shown in FIG. 3, for unscheduled APSD, the service period (1) starts when the station sends a trigger frame and (2) ends when the access point sets the EOSP bit in a downlink frame or transmits the next beacon. For simplicity, FIG. 3 shows the data frames having equal duration and the Ack frames also having equal duration. In general, the frames may have different durations, with the duration of each frame being dependent on the amount of data being sent and the rate used for the frame.

Figure 4:
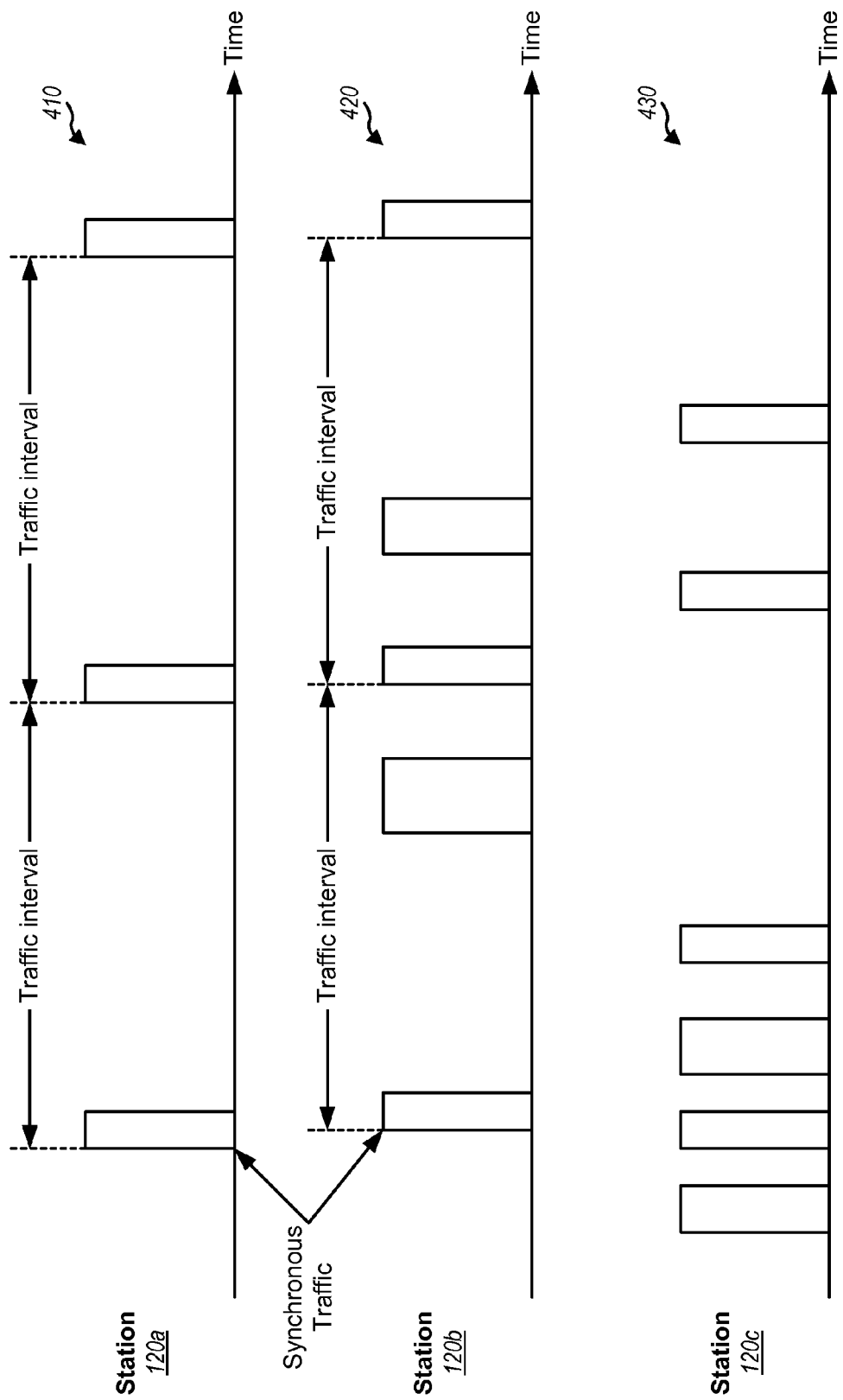
FIG. 4 shows transmission timelines for three stations.

FIG. 4 shows exemplary transmission timelines 410, 420 and 430 for three stations 120*a*, 120*b*, and 120*c* respectively, operating in unscheduled APSD mode. In this example, station 120*a* has a single periodic flow (e.g., for VoIP) that is sent periodically (e.g., every 10 or 20 ms). Station 120*b* has a periodic flow (e.g., for VoIP) and a non-periodic flow (e.g., for a data application such as web browsing). The periodic flow for station 120*b* may be sent in service periods that may overlap some or all of the service periods for the periodic flow of station 120*a*. These two flows may be deemed to be synchronous with one other if the overlapping occurs frequently enough. Station 120*c* has a non-periodic flow (e.g., for data downloading) that is sent in service periods that may overlap some of the service periods for stations 120*a* and 120*b*.

Periodic flows are commonly used for applications in which data is sent on a regular basis, such as VoIP, video, web-casting, online gaming, and so on. These periodic flows may have traffic intervals that are commonly used. For example, a traffic interval of 10 or 20 ms is commonly used for a VoIP flow. Even if each station can independently select its service times in unscheduled APSD, it is possible for two periodic flows to be synchronous with one another and have overlapping service periods because the source of their data is synchronized and the processing speed of the devices is equal. A station transmitting a flow A that is synchronous with another flow B of another station may experience frequent collisions with the other station. Each collision may result in transmission failures for both stations, which may require retransmissions and/or cause other undesirable effects. The collision probability is increased by the small size of the random backoff window used for low latency flows. For example, with a contention window size of four, if two flows have their data source synchronized, they will collide with a probability of 25%.

The collision avoidance techniques described herein allow a station to detect for synchronization of its traffic with traffic of another station and, if synchronization is detected, to shift the transmission of its traffic to avoid collision with the traffic of the other station. In general, the techniques may be used for unscheduled traffic as well as scheduled traffic. Unscheduled traffic is traffic/user data that is not scheduled by a designated entity (e.g., an access point) and hence has a risk of collision with traffic of other stations. Scheduled traffic is traffic/user data that is scheduled by a designated entity. Scheduled traffic covered by different access points may not be coordinated. Hence, the scheduled traffic in a network for one access point may be considered as unscheduled traffic in another network for another access point.

In general, a station may wake up from sleep and find the channel busy due to one of several scenarios. First, the channel may be busy due to random traffic on the channel. The likelihood of this occurring increases with higher traffic load in the wireless network. Second, the channel may be busy due to another station having similar traffic characteristic and sending and/or receiving data at approximately the same time. Accurate detection of synchronized traffic entails detection of the second scenario while avoiding the first scenario.

FIG. 5 shows an embodiment of a process 500 for avoiding collision for traffic. A station detects for synchronization of its traffic (e.g., for a periodic flow such as a VoIP flow) with traffic of at least one other station in a wireless network (block 512). Synchronization may be detected in various manners and based on various types of information, as described below. The station may confirm synchronization of its traffic (block 514). The station adjusts transmission of its traffic when synchronization is detected to avoid collision with the traffic of the at least one other station (block 516). Transmission of the traffic may be adjusted in various manners, as also described below. The station may operate in a power save mode and may wake up prior to each service period, send at least one frame of traffic in the service period, and sleep after the service period.

FIG. 6 shows an embodiment of an apparatus 600 for avoiding collision for traffic. Apparatus 600 includes means for detecting for synchronization of traffic of a station with traffic of at least one other station in a wireless network (module 612), means for confirming synchronization of the traffic of the station (module 614), and means for adjusting transmission of the traffic of the station when synchronization is detected to avoid collision with the traffic of the at least one other station (module 616). Modules 612 to 618 may comprise processors, electronics devices, hardware devices, electronics components, logical circuits, memories, etc., or any combination thereof.

A given station X may detect for synchronous flows in various manners and using various statistics and/or other information. Station X may perform detection for each flow sent by the station. For clarity, the following description assumes that station X has one flow of traffic.

In one detection embodiment, station X detects for synchronization of its traffic with traffic of other stations based on the percentage of first transmission failures. With EDCA, station X transmits a data frame, listens for an Ack for the transmitted frame, and retransmits the data frame until an Ack is received or the maximum number of retransmissions has been sent. Station X waits a pseudo-random backoff period after each transmission/retransmission failure. This pseudo-random backoff is designed to avoid repeated collisions by two stations trying to transmit at the same time, since each station waits a different pseudo-random amount of time before attempting retransmission. Thus, failures for the first transmission attempts may be useful in detecting synchronous traffic whereas failures for subsequent retransmission attempts may not be as useful.

Station X may keep track of the outcome (e.g., success or failure) of each first transmission attempt. Station X may determine the percentage of first transmission failures as the ratio of the number of first transmission failures to the number of first transmission attempts. Station X may compute the percentage of first transmission failures in each measurement interval, which may be selected to provide a sufficient number of samples to obtain a reasonably accurate measurement. As an example, for a VoIP flow in which a data frame is sent every 20 ms, a measurement interval of one second covers 50 first transmission attempts, a measurement interval of two seconds covers 100 first transmission attempts, and so on. Alternatively, station X may compute the percentage of first transmission failures as a running average over some predetermined number of most recent first transmission attempts. Station X may also compute the percentage of first transmission failures in other manners.

Station X may compare the percentage of first transmission failures against a predetermined threshold. Station X may declare its traffic to be synchronous with the traffic of another station if the percentage of first transmission failures exceeds the predetermined threshold. Station X may then take corrective action, as described below.

In the embodiment described above, station X does not attempt to determine whether the first transmission failures are due to collision with one other station or multiple other stations. This embodiment presumes that transmission failures are undesirable regardless of which station(s) might have caused the failures. In another embodiment, station X identifies the interfering station(s) and determines the percentage of first transmission failures for each interfering station. Station X may then declare its traffic to be synchronous with the traffic of another station if the percentage of first transmission failures for that station exceeds the predetermined threshold.

In another detection embodiment, station X detects for synchronization of its traffic with traffic of other stations based on information available from the MAC layer. In IEEE 802.11, the MAC layer maintains a set of counters for various statistics related to frames transmitted and received by the station. These counters are attributes of a management information base (MIB) at the MAC layer. Table 1 lists some of the counters maintained by the MAC layer and a short description for each counter. The counters in Table 1 are described in IEEE Std 802.11, 1999 Edition, entitled "Part 11: Wireless LAN Medium Access Control (MAC) and Physical Layer (PHY) Specifications," 1999, which is publicly available.

TABLE 1

| Counter | Description |
| --- | --- |
| dot11FailedCount | A counter for the number of frames unsuccessfully sent. This counter is incremented when a frame is not sent successfully after the maximum number of transmission/retransmission attempts. |
| dot11RetryCount | A counter for the number of frames successfully sent with at least one retransmission. |
| dot11MultipleRetryCount | A counter for the number of frames successfully sent with multiple retransmissions. |
| dot11TransmittedFrameCount | A counter for the number of frames successfully sent. |
| dot11ACKFailureCount | A counter that is incremented when an ACK is not received when expected. |
| dot11ReceivedFragmentCount | A counter that is incremented for each successfully received frame of type Data or Management. |
| dot11FCSErrorCount | A counter that is incremented when an FCS error is detected in a received frame. |

For clarity, the "dot11" prefix for each counter is omitted in the description below.

The RetryCount, MultipleRetryCount, and FailedCount give information on successively more severe problems in sending data from station X. The RetryCount gives the number of frames with at least one retransmission, the MultipleRetryCount gives the number of frames with multiple retransmissions, and the FailedCount gives the number of frames that completely failed. The TransmittedFrameCount gives information on the amount of data sent from the station. Various metrics may be defined based on these counters. In an embodiment, a metric is defined based on the RetryCount and the TransmittedFrameCount, as follows:

$$\text{First Transmission Failure Metric} = \frac{RetryCount}{TransmittedFrameCount}. \quad \text{Eq (1)}$$

The metric shown in equation (1) is equal to the percentage of first transmission failures described above if each frame that fails on the first transmission attempt is successfully sent in a subsequent retransmission. The metric in equation (1) may be compared against a threshold, and synchronization may be declared if the metric exceeds the threshold.

In another embodiment, a metric is defined based on a function of the RetryCount, MultipleRetryCount, and FailedCount, as follows:

$$\text{Sync Metric} = f(RetryCount, MultipleRetryCount, FailedCount), \quad \text{Eq (2)}$$

where $f(\ )$ may be any function of the parameters within the parentheses. In one embodiment, $f(\ )$ is a function of the rate of the RetryCount, MultipleRetryCount, and FailedCount relative to the outgoing frame rate. In another embodiment, $f(\ )$ is a function of the rate of growth of the RetryCount, MultipleRetryCount, and FailedCount relative to the outgoing frame rate. In general, a high rate and/or an increasing rate of the RetryCount, MultipleRetryCount, and/or FailedCount may indicate greater likelihood of collision for outgoing frames and synchronization with the traffic of other stations.

In yet another embodiment, station X detects for synchronization based on the ACKFailureCount, ReceivedFragmentCount and/or FCSErrorCount. Station X may send a trigger frame to the access point to start a service period. The access point may perform backoff and the transmit data to station X. However, another station Y may have a flow that is synchronous with the access point. Station Y may complete its backoff at the same time as the access point, and the uplink transmission from station Y may collide with the downlink transmission from the access point. In this case, station X's receive counters may show large numbers of errors due to interfering transmission from station Y. The receive counters may thus be used for detection of synchronization between the downlink transmission from the access point with the uplink transmission from another station.

Station X may also detect for synchronization of its traffic with traffic of other stations based on other information. In an embodiment, station X uses information from a QBSS Load element that is broadcast in the beacon by the access point. This QBSS Load element includes (1) a Station Count field that indicates the total number of stations currently associated with the access point, (2) a Channel Utilization field that indicates the percentage of time the access point sensed the channel was busy, and (3) an Available Admission Capacity field that indicates the amount of channel time available via explicit admission control. These fields contain information on the current station population and the traffic levels at the access point and may be used to detect for synchronization. For example, synchronization may be more likely if the access point is associated with more stations, if the channel is busy for a higher percentage of time, and/or if less channel time is available.

In yet another detection embodiment, station X detects for synchronization of its traffic with traffic of other stations based on frames sent by the access point. When station X sends a frame on the uplink to the access point, station X expects a response from the access point. However, the access point may be in the middle of a service period for another station and may send a frame to this other station. Thus, if station X receives a frame intended for another station when expecting a frame for itself, then station X may deem that its service period overlaps the service period for another station. Station X may declare synchronized traffic if this occurs for a predetermined number of service periods.

Station X may confirm that its traffic is synchronized with the traffic of other stations prior to adjusting the transmission of its traffic. In an embodiment, station X skips or delays transmission of a frame for one service period and monitors the channel for activity instead. If a frame from another station is received during this time, then synchronized traffic with another station may be confirmed. In another embodiment, station X monitors the channel for multiple service periods to confirm synchronization with greater confidence. Station X may also confirm synchronization in other manners. The confirmation may also be considered a part of the detection process.

Station X may adjust transmission of its traffic upon detecting (and possibly confirming) synchronization of its traffic with the traffic of other stations. Station X may adjust its transmission in various manners.

In an embodiment, station X shifts its service times by a predetermined fixed amount $\Delta_F$ so that its new service times are $\Delta_F$ from the current service times. In another embodiment, station X shifts its service times by a pseudo-random amount $\Delta_R$. The shifted amount $\Delta_F$ or $\Delta_R$ may be given in any unit of time, e.g., in slots or in microseconds (µs). A slot may be 20 µs for 802.11b or 9 µs for 802.11a/g. In yet another embodiment, station X monitors the channel for idle periods during which it can safely send its transmission. Station X may confirm that the channel is idle for some number of service periods before shifting its service times.

In yet another embodiment, station X determines when the synchronized transmission from an interfering station finishes and then starts its transmission (e.g., begins a backoff procedure) after the interfering station finishes. In yet another embodiment, station X waits an additional period of time after the interfering station finishes before starting its own transmission. For EDCA in IEEE 802.11, an access point may wait a PIFS duration after the end of a busy channel period before accessing the channel, whereas a station waits a DIFS duration and the amount of time specified by the backoff counter prior to accessing the channel. The PIFS duration is shorter than the DIFS duration to give the access point higher priority in accessing the channel. Station X may wait an additional duration after the interfering station finishes, in order to defer access of the channel to the access point, before starting its own transmission. The transmission duration for the interfering station may vary from service period to service period. Thus, in the embodiments described above, station X may monitor the channel over some number of service periods to determine the likely time in which the interfering station finishes transmission.

If two stations have synchronized traffic, then only one station (which is referred to as a designated station) should adjust its transmission to avoid synchronization. In an embodiment, the designated station is determined based on a unique 48-bit MAC address assigned to each station. Each station includes its MAC address in the header of each data frame sent by that station. Station X may discover the MAC address of another station by monitoring the channel during the time when a frame is likely to be received from the other station (which should coincide with the service period of station X if synchronization is present) and decoding the received frame to obtain the MAC address of the other station. A rule may be defined such that the station with the smaller MAC address is the designated station that should adjust its transmission while the station with the larger MAC address should do nothing. The designated station may also be ascertained in other manners using other information and/or based on other rules. In another embodiment, the designated station is determined based on signaling exchanged among the colliding stations.

The adjustment of transmission may be achieved in various manners at station X. In one embodiment, a data source (e.g., a vocoder used for VoIP) delays its output data by a time adjustment Δ to avoid collision. The time adjustment Δ may be selected based on any of the embodiments described above. The data source may provide output data at the same rate (e.g., a frame every 20 ms) but at different time instants. In another embodiment, the MAC layer receives frames from higher layer at designated time instants and delays the frames by Δ to avoid collision. The adjustment may also be performed at other layers (e.g., an application layer) and/or in other manners.

The collision avoidance techniques described herein are different from the collision avoidance performed by EDCA at the physical layer. EDCA avoids collision by sensing for an idle channel (which is called carrier sensing) before transmitting on the channel. However, collision may occur even with carrier sensing. For example, collision may result from two stations picking the same random backoff number. These two stations may both count down to zero during the last idle slot of their countdown and may simultaneously start a transmission in the next slot. The collision avoidance techniques described herein may operate on top of EDCA and may be able to avoid collisions that occur even with carrier sensing. The techniques may be implemented at any layer (e.g., an application layer) above the physical layer.

In general, a station may detect for synchronization of its traffic and adjust its transmission in various manners such that its traffic is not synchronized with the traffic of other stations. The station may act autonomously without having to exchange signaling with either the access point or other stations, which may simplify operation. The station is essentially able to form a schedule for its traffic by avoiding collision with other stations.

The collision avoidance techniques described herein may be used for various types of traffic. The techniques are especially applicable for periodic flows that carry traffic on a regular basis, such as VoIP flows. The techniques may also be used for (1) a normal mode without any power saving features and (2) a power save mode with power saving features, such as unscheduled APSD in IEEE 802.11e or power-save mode in IEEE 802.11. The techniques are well suited for unscheduled APSD because each station can autonomously select its service times for both uplink and downlink traffic and can adjust its service times to avoid collision. Also, most portable stations use power saving mechanisms by default to maximize battery life.

The collision avoidance techniques described herein may provide various advantages such as higher network capacity, greater power savings for the stations, and reduced delays for traffic. When a station transmits traffic and experiences collision at a frequent rate, the station may detect that its traffic is synchronized with the traffic of one or more other stations. The station may adjust the transmission of its traffic such that the likelihood of collision is reduced. The lower collision probability reduces the number of retransmissions, which results in more idle time in the channel and potentially improves network capacity. The lower collision probability also results in a higher first transmission success rate, which allows the station to power down earlier to conserve battery power and also avoids additional delays associated with retransmissions. Other advantages may also be obtained with the techniques described herein.

Figure 7:
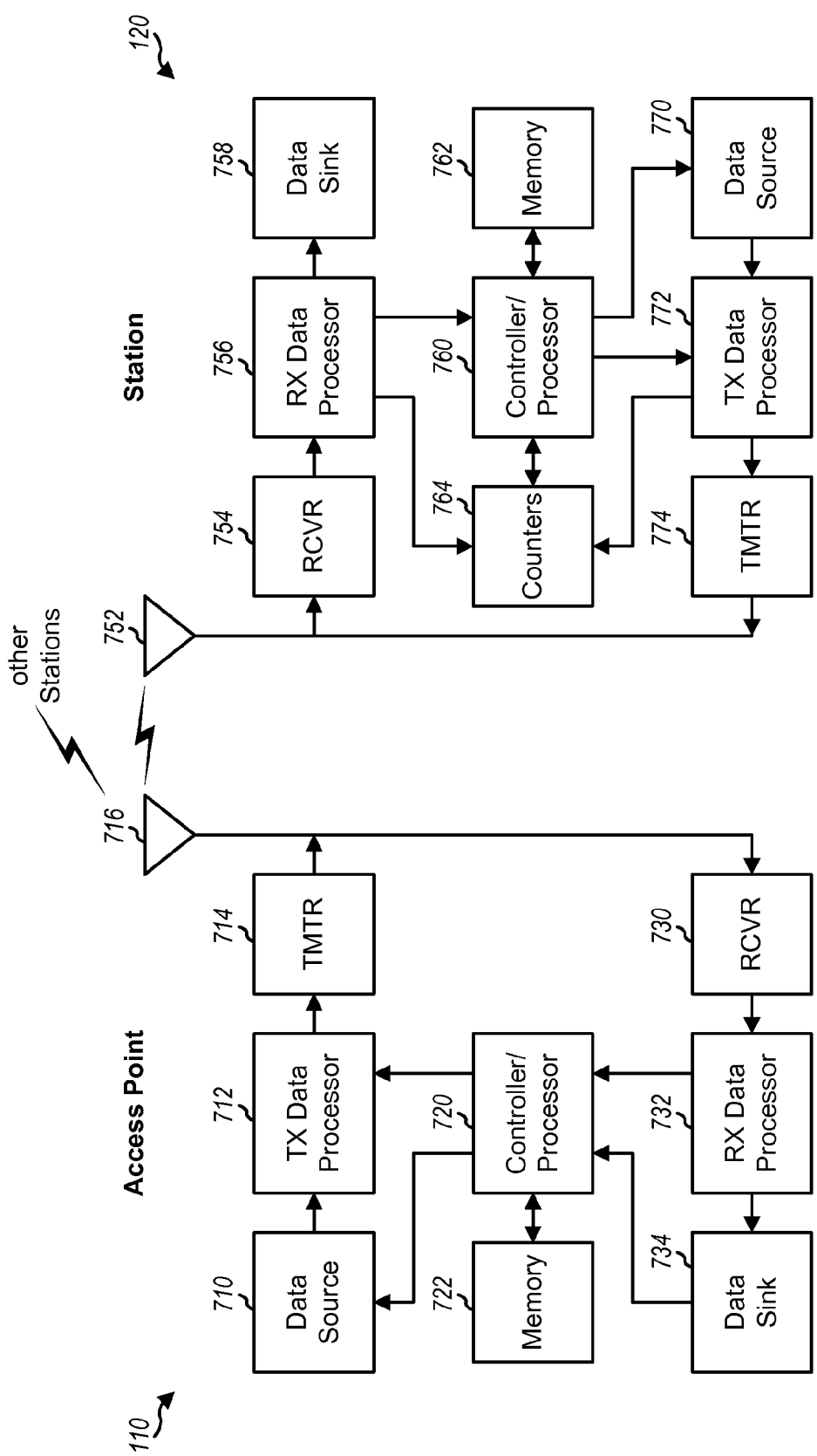
FIG. 7 shows a block diagram of the access point and one station.

FIG. 7 shows a block diagram of access point 110 and station 120, which may be one of the stations in FIG. 1. On the downlink, at access point 110, a transmit (TX) data processor 712 receives traffic data from a data source 710 for the stations being served and control data (e.g., QBSS load information) from a controller/processor 720. TX data processor 712 processes (e.g., encodes, interleaves, modulates, and scrambles) the data for each station based on a rate selected for that station, processes control data, and generates output chips. A transmitter (TMTR) 714 processes (e.g., converts to analog, amplifies, filters, and frequency upconverts) the output chips and generates a downlink signal, which is transmitted from an antenna 716 to the stations.

At station 120, an antenna 752 receives the downlink signal from access point 110 as well as uplink signals from other stations and provides a received signal. A receiver (RCVR) 754 processes the received signal and provides samples. A receive (RX) data processor 756 processes (e.g., descrambles, demodulates, deinterleaves, and decodes) the samples, provides decoded data for station 120 to a data sink 758, and provides control data to a controller/processor 760.

On the uplink, at station 120, a TX data processor 772 receives traffic data from a data source 770 and control data from controller/processor 760. TX data processor 772 processes the traffic and control data based on a rate selected for the station and generates output chips. A transmitter 774 processes the output chips and generates an uplink signal, which is transmitted from antenna 752 to access point 110.

At access point 110, antenna 716 receives the uplink signals from station 120 and other stations. A receiver 730 processes a received signal from antenna 716 and provides samples. An RX data processor 732 processes the samples and provides decoded data for each station to a data sink 734 and provides control data to controller/processor 720.

Controllers/processors 720 and 760 direct operation at access point 110 and station 120, respectively. Controller/processor 760 may also perform collision avoidance described herein and may implement process 500 in FIG. 5. Memories 722 and 762 store data and program codes for access point 110 and station 120, respectively. Counters 764 may be used for various statistics of transmitted frames, as described above.

The collision avoidance techniques described herein may be implemented by various means. For example, these techniques may be implemented in hardware, firmware, software, or a combination thereof. For a hardware implementation, the processing units used to detect for synchronization of traffic and avoid collision may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 762 in FIG. 7) and executed by a processor (e.g., processor 760). The memory may be implemented within the processor or external to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
at least one processor configured to detect for synchronization of traffic of a station with traffic of at least one other station in a wireless network using a metric based on a function of a number of frames successfully sent with at least one retransmission, and to adjust transmission of the traffic of the station when synchronization is detected by shifting service times by a predetermined or pseudo-random amount of time to avoid collision with the traffic of the at least one other station; and
a memory coupled to the at least one processor.

2. The apparatus of claim 1, wherein the at least one processor is configured to generate frames for the traffic of the station and to send a first transmission and, if necessary, at least one retransmission for each of the frames.

3. The apparatus of claim 2, wherein the at least one processor is configured to detect for synchronization of the traffic of the station based on percentage of first transmission failures for the frames.

4. The apparatus of claim 2, wherein the at least one processor is configured to detect for synchronization of the traffic of the station based on a first counter for the number of frames successfully sent with at least one retransmission and a second counter for the number of frames successfully sent.

5. The apparatus of claim 4, wherein the at least one processor is configured to detect for synchronization of the traffic of the station based further on a third counter for the number of frames successfully sent with multiple retransmissions and a fourth counter for the number of frames unsuccessfully sent.

6. The apparatus of claim 1, wherein the at least one processor is configured to detect for synchronization of the traffic of the station based on counters for a management information base (MIB) in a medium access control (MAC) layer in IEEE 802.11.

7. The apparatus of claim 1, wherein the at least one processor is configured to detect for synchronization of the traffic of the station based on network load information received from an access point in the wireless network.

8. The apparatus of claim 1, wherein the at least one processor is configured to detect for synchronization of the traffic of the station based on reception of frames intended for the at least one other station during time periods when frames intended for the station are expected.

9. The apparatus of claim 1, wherein the at least one processor is configured to confirm synchronization of the traffic of the station prior to adjusting transmission of the traffic.

10. The apparatus of claim 9, wherein the at least one processor is configured to monitor a wireless channel for activity during a service period for the station and to confirm synchronization of the traffic of the station if activity is detected during the service period.

11. The apparatus of claim 1, wherein the at least one processor is configured to adjust transmission of the traffic of the station by a predetermined amount of time when synchronization is detected.

12. The apparatus of claim 1, wherein the at least one processor is configured to adjust transmission of the traffic of the station by a pseudo-random amount of time when synchronization is detected.

13. The apparatus of claim 1, wherein the at least one processor is configured to delay transmission of the traffic of the station until after transmission of the traffic of the at least one other station finishes.

14. The apparatus of claim 1, wherein the at least one processor is configured to detect for idle periods in a wireless channel and to move transmission of the traffic of the station to the idle periods.

15. The apparatus of claim 1, wherein the at least one processor is configured to determine whether to adjust transmission of the traffic of the station or to defer to the at least one other station to adjust transmission to avoid collision.

16. The apparatus of claim 1, wherein the at least one processor is configured to determine whether or not to adjust transmission of the traffic of the station based on medium access control (MAC) addresses of the station and the at least one other station.

17. The apparatus of claim 1, wherein the traffic of the station is for a periodic flow, and wherein the at least one processor is configured to send frames of the periodic flow in service periods spaced apart by a traffic interval.

18. The apparatus of claim 1, wherein the traffic of the station is for voice-over-IP (VoIP).

19. The apparatus of claim 17, wherein for each service period the at least one processor is configured to wake up prior to the service period, to send at least one frame in the service period, and to sleep after the service period.

20. The apparatus of claim 1, wherein the at least one processor is further configured to determine that the at least one other station has completed its interfering transmission prior to starting the transmission of the traffic of the station.

21. The apparatus of claim 1, wherein the at least one processor is further configured to:
determine an identifier of the at least one other station; and
determine that the apparatus is a designated station from among the apparatus and the at least one other station in accordance with the identifier of the at least one other station,
wherein the at least one processor, being configured to adjust transmission of the traffic of the station when synchronization is detected, is further configured to adjust the transmission in accordance with the determination that the apparatus is the designated station.

22. A method comprising:
detecting for synchronization of traffic of a station with traffic of at least one other station in a wireless network using a metric based on a function of a number of frames successfully sent with at least one retransmission; and
adjusting transmission of the traffic of the station when synchronization is detected by shifting service times by a predetermined or pseudo-random amount of time to avoid collision with the traffic of the at least one other station.

23. The method of claim 22, wherein the detecting for synchronization of the traffic of the station comprises detecting for synchronization of the traffic of the station based on percentage of first transmission failures for the traffic.

24. The method of claim 22, wherein the detecting for synchronization of the traffic of the station comprises detecting for synchronization of the traffic of the station based on counters for a management information base (MIB) in a medium access control (MAC) layer in IEEE 802.11.

25. The method of claim 22, further comprising:
confirming synchronization of the traffic of the station prior to adjusting transmission of the traffic.

26. The method of claim 22, wherein the adjusting transmission of the traffic of the station comprises adjusting transmission of the traffic of the station by a predetermined or pseudo-random amount of time when synchronization is detected.

27. The method of claim 22, further comprising:
waking up prior to a service period;
sending at least one frame in the service period; and
sleeping after the service period.

28. An apparatus comprising:
means for detecting for synchronization of traffic of a station with traffic of at least one other station in a wireless network using a metric based on a function of a number of frames successfully sent with at least one retransmission; and
means for adjusting transmission of the traffic of the station when synchronization is detected by shifting service times by a predetermined or pseudo-random amount of time to avoid collision with the traffic of the at least one other station.

29. The apparatus of claim 28, wherein the means for detecting for synchronization of the traffic of the station comprises means for detecting for synchronization of the traffic of the station based on percentage of first transmission failures for the traffic.

30. The apparatus of claim 28, wherein the means for detecting for synchronization of the traffic of the station comprises means for detecting for synchronization of the traffic of the station based on counters for a management information base (MIB) in a medium access control (MAC) layer in IEEE 802.11.

31. The apparatus of claim 28, further comprising:
means for confirming synchronization of the traffic of the station prior to adjusting transmission of the traffic.

32. The apparatus of claim 28, wherein the means for adjusting transmission of the traffic of the station comprises means for adjusting transmission of the traffic of the station by a predetermined or pseudo-random amount of time when synchronization is detected.

33. The apparatus of claim 28, further comprising:
means for waking up prior to a service period;
means for sending at least one frame in the service period; and
means for sleeping after the service period.

34. A non-transitory processor readable media for storing instructions operable in a station to: detect for synchronization of traffic of the station with traffic of at least one other station in a wireless network using a metric based on a function of a number of frames successfully sent with at least one retransmission; and adjust transmission of the traffic of the station when synchronization is detected by shifting service times by a predetermined or pseudo-random amount of time to avoid collision with the traffic of the at least one other station.

35. An apparatus comprising:
at least one processor configured to detect for synchronization of a voice-over-IP (VoIP) flow of a station with at least one periodic flow of at least one other station in a wireless network using a metric based on a function of a number of frames successfully sent with at least one retransmission, and to adjust transmission of the VoIP flow when synchronization is detected by shifting service times by a predetermined or pseudo-random amount of time to avoid collision with the at least one periodic flow of the at least one other station; and
a memory coupled to the at least one processor.

36. The apparatus of claim 35, wherein the at least one processor is configured to transmit frames for the VoIP flow in service periods spaced apart by a traffic interval, to maintain counters for statistics of the transmitted frames, and to detect for synchronization of the VoIP flow based on the counters.

37. The apparatus of claim 35, wherein the at least one processor is configured to shift service times for the VoIP flow to avoid collision with the at least one periodic flow of the at least one other station.

\* \* \* \* \*